Oct. 19, 1926.

G. C. JETT 1,603,543

FLEXIBLE WHEEL MOUNTING

Filed Sept. 27, 1922

Inventor:
GEORGE C. JETT.
By:
Ira J. Wilson
Attorney.

Patented Oct. 19, 1926.

1,603,543

UNITED STATES PATENT OFFICE.

GEORGE C. JETT, OF MILWAUKEE, WISCONSIN, ASSIGNOR OF TWO-FIFTHS TO WALTER H. STIEMKE, OF MILWAUKEE, WISCONSIN.

FLEXIBLE WHEEL MOUNTING.

Application filed September 27, 1922. Serial No. 590,847.

This invention relates generally to a mounting or supporting structure for wheels, and while capable of use for many purposes, it is illustrated herein as embodied in a structure suitable for supporting track wheels designed to carry a load, and the specific form of the invention disclosed is particularly adapted for use in connection with creeper tractor mechanisms of the type shown in my pending application, Serial No. 590,848, filed September 27, 1922.

The supporting wheels or rollers in this instance are arranged in pairs and adapted to travel on tracks and are designed to support or carry the weight of the tractor. In such a construction, the wheel mounting must be capable of resisting without breakage heavy shock loads which are frequently imposed thereon and must also be capable of supporting constant live loads which impose vertical, horizontal, and also diagonal and torsional stresses upon the mounting.

One of the primary purposes of this invention is to provide a mounting of the character indicated which will be flexible in character so as to permit distortion and deflection of the frame work supported by the wheels without imposing upon the journal box injurious stresses and strains, this result being accomplished by flexibly connecting the journal box to the frame structure so as to permit of relative torsional movements between the journal box and frame, while at the same time precluding relative vertical movements between said frame as a whole and the journal box.

Another purpose of my invention is to provide a mounting in which the journal box and the wheels form a unit which can be readily assembled and attached to the frame structure, and which can be quickly disassembled and taken apart when occasion requires.

Another purpose of the invention is to provide a mounting which will be strong and durable, capable of sustaining both radial and thrust loads, while still being of light weight construction so as to be economical to manufacture, the structure and method of connection with the frame being such that the journal box may be made of cheap low tensile strength metal and may be equipped with bearing metal formed integrally with the journal box casting and providing the bearing surfaces for the wheel axis.

A further purpose is to provide a mounting having an air tight, dust-proof bearing to which lubricant is supplied, the construction being such that distribution of the lubricant to all bearing surfaces is ensured and the entrance of dust into the bearing is precluded.

Various other objects and advantages of this invention should be appreciated as the same becomes better understood by reference to the following description when considered in connection with the accompanying drawings.

Referring to the drawings.

Figure 1:
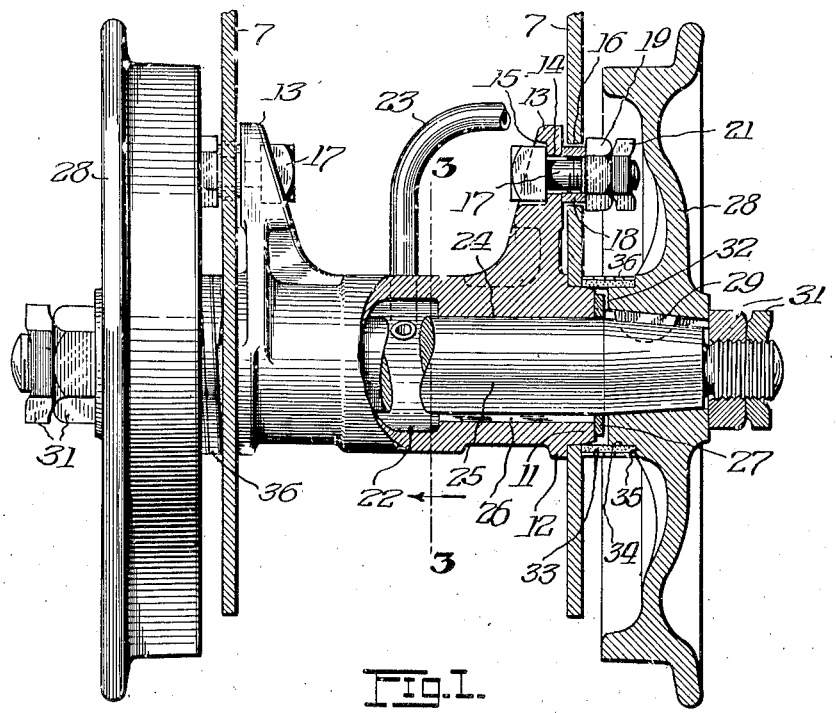
Fig. 1 is a side elevation partially in section of a mounting embodying a preferred form of my invention.
Figure 2:
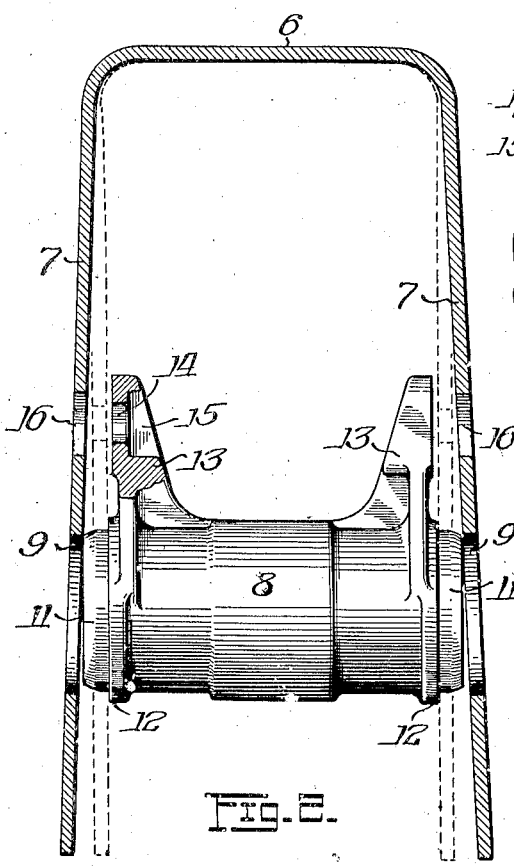
Fig. 2 is a somewhat similar view showing a side frame in cross section and illustrating the manner of attachment of the journal box thereto.
Figure 3:
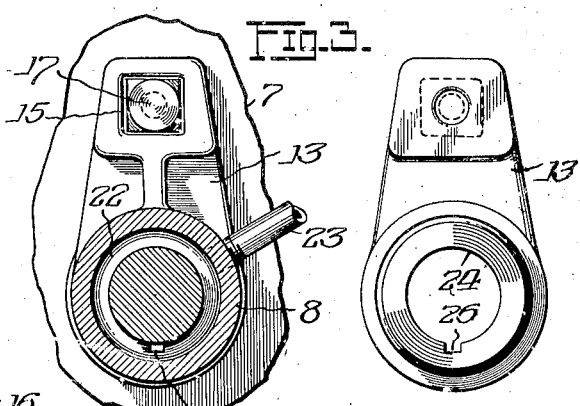
Fig. 3 is a sectional view on the line 3—3 of Fig. 1.
Figure 4:
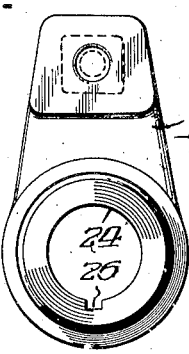
Fig. 4 is an end view of the journal box.
Figure 5:
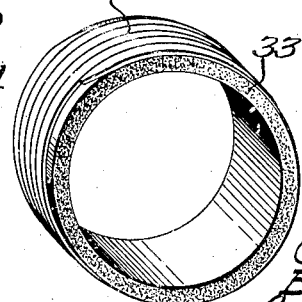
Fig. 5 is a perspective view of one of the packing sleeves.

Referring now to the drawings more in detail, and particularly to Figs. 1 and 2 thereof, reference character 6 indicates generally a frame structure which in the present instance is shown as a U-shaped sheet metal member adapted to serve as a side frame of the creeper tractor mechanism disclosed in my co-pending application above referred to, and comprising the downwardly extending side members 7 between which the journal box indicated generally by reference character 8 is disposed. The side members 7 are provided with aligned apertures 9 adapted to receive and snugly embrace the ends 11 of the journal box which project beyond the annular shoulders or abutments 12. In order to assemble these parts, the side members 7 are spread apart into the position shown in full lines in Fig. 2, permitting the introduction of the journal box between them, whereupon when the projections 11 are aligned with the openings 9, the side members assume their normal position indicated in dotted lines in Fig. 2 and in full lines in Fig. 1, with the projections 11 seated in the openings 9 and extending beyond the outer faces of the side members.

The journal box which is preferably of cast construction is formed to provide near each end an upwardly extending arm 13, the outer face of which is spaced slightly inwardly from the plane of the outer face of the shoulder 12, as will be apparent from Fig. 1. from which it will be observed that the faces of the arms 13 opposed to the side members 7 are spaced slightly therefrom.

Each arm is provided with a bolt opening 14 and a bolt head receiving socket 15, and the side members 7 are similarly provided with openings 16 disposed in alignment with the arm openings 14. Bolts 17 project through the aligned openings 14 and 15, and a spacing sleeve 18 loosely surrounding the bolt 17 and loosely disposed within the opening 16 is clamped between the arm 13 and the nut 19 threaded onto the outer end of the bolt and held against displacement by a lock nut 21.

It will be apparent that the connection between the journal box and the side members formed by the extensions 11 disposed within the openings 9, and the lost motion or loose connection between each arm 13 and its side member together provide a flexible connection between the journal box and the side frame which will permit of considerable flexibility and torsional and twisting movements of the side frame without subjecting the journal box to excessive stresses and strains. In other words, considerable relative vertical movements between the ends of the journal box are permitted, the side frame being adapted to flex and distort in conformity with these movements with the result that the load is carried at all times by both ends of the journal box instead of being concentrated at one end as would frequently happen were the journal box and side frame rigidly secured together without provision for flexibility.

The journal box is formed to provide a central enlarged chamber 22 adapted to receive lubricant through a tube 23, or other means for supplying the same, and at each side of the chamber elongated bearing surfaces 24 are provided in which is journaled the axle 25. Lubricant is supplied to the bearing surfaces from the chamber 22 through grooves 26 formed in the journal box beneath the axle. A thrust washer 27 surrounds the axle at each end of the journal box and outside each washer a bearing wheel 28 preferably of the flanged type is secured by a key 29 to the axle and locked in position by the nuts 31. The wheels are preferably so positioned that a space 32 is left between the inner end of the wheel hub and the thrust washer 27 so as to permit of a limited amount of end play of the axle in the journal box which serves to pump the lubricant outwardly along the axle in each direction from the chamber 22 so as to ensure adequate lubrication of the relatively heavy parts.

In order to prevent the escape of lubricant through the space 32 and to preclude the entrance of dust and dirt into the bearing at this point, I have provided a packing sleeve 33 of leather or other suitable material, which snugly embraces the annular projecting end 11 of the journal box and also the inner end of the wheel hub which is turned down as indicated at 34 (Fig. 1) to the same diameter as the perimeter of the journal box end 11. This sleeve therefore snugly embraces the end of the journal box and the opposed end of the wheel hub and fits snugly between the outer face of the side member 7 and the opposed shoulder 35 on the wheel hub so as to form a seal at this point which prevents the escape of lubricant and also precludes the entrance of dust and dirt into the bearing. The sleeve may be held in position in any suitable manner, but preferably it is surrounded by a flat helical spring 36 which maintains the sleeve under the requisite tension and ensures an air tight, grease tight, and dirt-proof joint.

It should be manifest from the foregoing that I have provided a flexible wheel mounting including a rigid journal box flexibly mounted in a side frame so as to provide flexibility between the wheels and the side frame carried thereby which will enable the wheels to travel over uneven ground without imposing excessive stresses and strains either upon any portion of the journal box itself, or upon either side member of the side frame. The construction ensures also adequate lubrication of the moving parts, and in addition retains the lubricant against escape, and furthermore precludes the entrance of dust and dirt into the bearings. The structural details of the mounting may obviously be varied within wide limits without departing from the spirit of the invention as set forth in the following claims.

I claim:

1. In a flexible wheel mounting, the combination of a frame structure, a journal box, a wheel rotatably associated with said box, and means including the ends of the journal box and loose connections spaced from said ends for so connecting said journal box to said frame structure as to preclude relative movements between the same perpendicularly to the axis of said wheel while permitting flexing movements of the frame relatively to said journal box.

2. In a flexible wheel mounting, the combination of a frame, a journal box flexibly mounted in said frame but immovable vertically of the frame, and a wheel carried by said journal box at each end thereof.

3. In a flexible wheel mounting, the combination of a flexible frame, a rigid journal box connected to said frame, and a wheel carried by said journal box at each side of said frame.

4. In a flexible wheel mounting, the combination of a flexible frame, comprising a pair of spaced side members, a journal box disposed between and extending through said side members and flexibly connected thereto, and wheels associated with said journal box outside of said members.

5. In a flexible wheel mounting, the combination of a flexible frame, comprising a pair of spaced side members, a journal box disposed between and projecting through said side members, and a loose connection between said journal box and said members remote from the axis of said journal box.

6. In a flexible wheel mounting, the combination of a frame comprising a pair of spaced side members, a journal box having weight bearing portions projecting through said side members, and lost motion connections between said members and said journal box radially distant from the bearing portions of said box.

7. In a flexible wheel mounting, the combination of a frame structure, comprising a pair of spaced side members, a journal box disposed between said members and having weight bearing portions extending through the members, arms projecting radially from said box in proximity to said side members and a lost motion connection between each of said arms and its opposed side member.

8. In a flexible wheel mounting, the combination of a pair of spaced side members, a journal box disposed between said members with its ends projecting outwardly through the members, arms extending radially from said box parallel with but in spaced relation to said side members, and means including a spacing member and a bolt for providing a lost motion connection between each of said arms and its opposed side member.

9. In a flexible wheel mounting, the combination of a journal box, frame members engaging the ends of said box, arms projecting radially upwardly from said box in proximity to said frame members, bolts extending through said arms and their opposed frame members, a spacing sleeve surrounding each bolt and extending through its respective side member and projecting outwardly beyond said member at each face thereof, and a nut threaded onto each bolt and clamping said spacing sleeve to said arm, whereby a lost motion connection is provided between each arm and its respective frame member.

10. In a wheel mounting, a flexible frame including a pair of spaced side members, a journal box disposed between and through said side members, means for securing said journal box to each of said side members, and wheels associated with said journal box outside of said members.

11. In a wheel mounting, an inverted U-shaped frame of flexible metal, a rigid metal journal box disposed between and extending into openings formed through the legs of the frame, means for securing said journal box to said legs and against displacement from the openings therein, an axle associated with said journal box, and a wheel on said axle.

12. In a wheel mounting, a journal box, flexible metal frame members engaging the ends of said box, arms projecting radially from said box in proximity to said frame members, and bolts extending through said arms and members, whereby said box and members may be secured in relative position.

GEORGE C. JETT.